United States Patent [19]

Kennedy

[11] Patent Number: 4,914,856
[45] Date of Patent: Apr. 10, 1990

[54] BAIT CONTAINER FOR CRUSTACEAN TRAPS

[76] Inventor: Garrett R. Kennedy, 1118 Second St., Kirkland, Wash. 98033

[21] Appl. No.: 277,025

[22] Filed: Nov. 28, 1988

[51] Int. Cl.⁴ ............................................. A01K 97/04
[52] U.S. Cl. .......................................... 43/55; 43/100
[58] Field of Search .................. 43/100, 102, 105, 55, 43/44.99; 206/315.11

[56] References Cited

U.S. PATENT DOCUMENTS

| | | | |
|---|---|---|---|
| 1,934,815 | 11/1933 | Parrott | 43/55 |
| 2,602,261 | 7/1952 | Mann | 43/100 |
| 3,842,529 | 10/1974 | Richard | 43/100 |
| 4,095,365 | 6/1978 | Ray | 43/55 |

Primary Examiner—Kurt Rowan
Attorney, Agent, or Firm—Roy E. Mattern, Jr

[57] ABSTRACT

A bait container is made from acryloitrile butadiene styrene, known as ABS, plastic tubing and ABS plastic sheets, the latter preferably being white. Cut circular white ends are adhesively secured in place at the ends of the cut tubing, during the assembly of this bait container. A panel of the cut tubing is cut away to create an entry for the bait. The panel is pivoted back into place to contain the bait. A latching of a handle, secured to the panel, keeps the panel in place. In other portions of the hollow cylindrical body, formed by the closed end cut tube, closely spaced radial slots are formed to controllably release the bait, while keeping many forms of marine life from entering into the interior of this bait container. A stainless steel rod or wire extends throughout the bait container and beyond, terminating in hooks, which are adapted to receive holders positioning this bait container within a crustacean trap. A portion of the stainless steel rod is secured to the hollow cylindrical body to maintain its position.

7 Claims, 2 Drawing Sheets

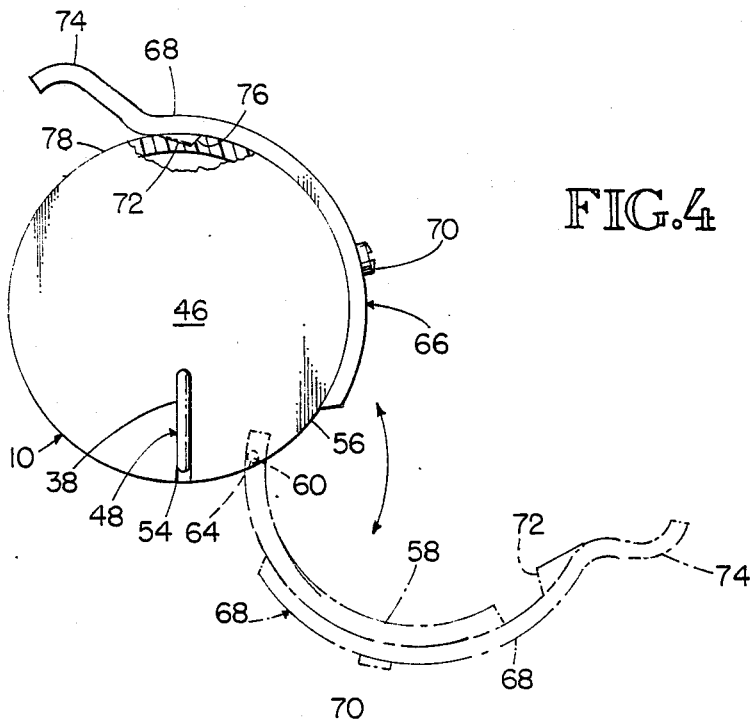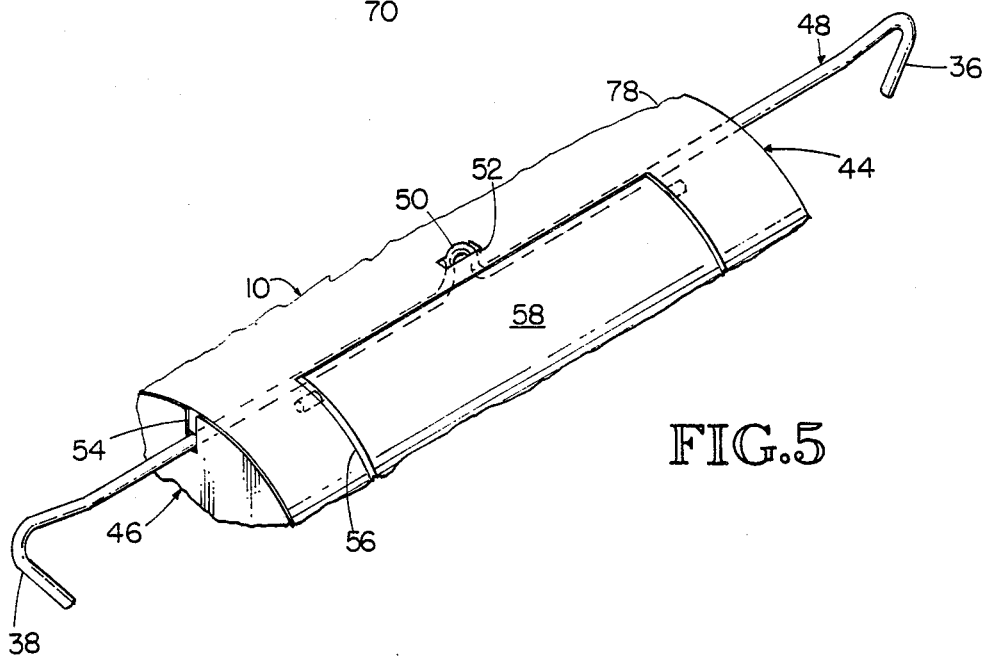

BAIT CONTAINER FOR CRUSTACEAN TRAPS

BACKGROUND

Over the years many types of bait containers have been provided for traps used in trapping crustaceans such as crabs, shrimp, and lobster. Today many bait containers are made of wood with hinged covers, fasteners, and hooks extending outwardly to receive holding members securing the bait container within the trap for crustaceans. A chlorophenol based preservative is used to prolong the life of the wood submerged in the sea water.

In 1965, Henry Hershey in his patent 3,176,427 illustrated and described his bait bag for crab fishing made of stainless steel wires and rings.

In 1986, Michael A. Drebot in his patent 4,563,832 illustrated and described his bait container formed with apertured sides comprising at least 35 per cent of the surface area of the side walls. The apertures ranged in size from 250 to about 1000.

However, there remained a need for a low cost, long lasting, bait container made of durable plastic materials, derived from commercially available plastic products, i.e. ABS plastic tubing and ABS plastic sheet.

SUMMARY

A bait container for crustacean traps is economically made from economical long lasting principal plastic components formed from commercially available plastic products, i.e. ABS plastic tubing and ABS plastic sheet. Preferably the ABS plastic sheet is white.

A hollow cylindrical body is made by cutting a selected length of ABS plastic tubing of a selected diameter. A bait loading entry is made by cutting out a carved panel in some portion of the tubing. Bait secretion narrow slots are radially cut at longitudinal spaces by gang saws in some other portions of the tubing. Circular ends are cut from the white ABS plastic sheet and later adhesively secured to create a hollow cylindrical body. A continuous stainless steel rod, serving as a positioner, is extended throughout the length of the hollow cylindrical body and beyond, terminating in hooks, adapted to be used to receive holding members, which position the bait container in the crustacean trap. This steel rod in a center portion has an offset radial portion to interfit with a recess cut in the tube to thereby keep this stainless steel rod longitudinally and radially positioned with respect to the plastic tubing.

The curved panel of the tubing, resulting from cutting the bait loading entry, is pivotally secured to the hollow cylindrical body. A partial cylindrical strip of plastic material is cut and formed to serve as a handle, secured to the curved panel by using a stainless steel fastener. The handle end has an upturned finger gripping portion and an adjacent downward projecting portion, the latter portion interfitting with a depression in the hollow cylindrical body, thereby creating a latch to hold the curved pivotal panel in place, after the bait has been placed in this bait container.

DRAWINGS

A preferred embodiment of this bait container for crustacean traps is illustrated in the drawings, wherein:

FIG. 4 is an end view of the bait container, indicating in phantom lines, the opening of the cover of the bait loading entry, upon manipulating the handle; and FIG. 5 is a partial perspective view showing the positioning and securement of the stainless steel rod or wire, which has hooks at each end, adapted to be secured to holders used in positioning the bait container within the crustacean trap.

DESCRIPTION OF THE PREFERRED EMBODIMENT OF THE BAIT CONTAINER

Figure 1:
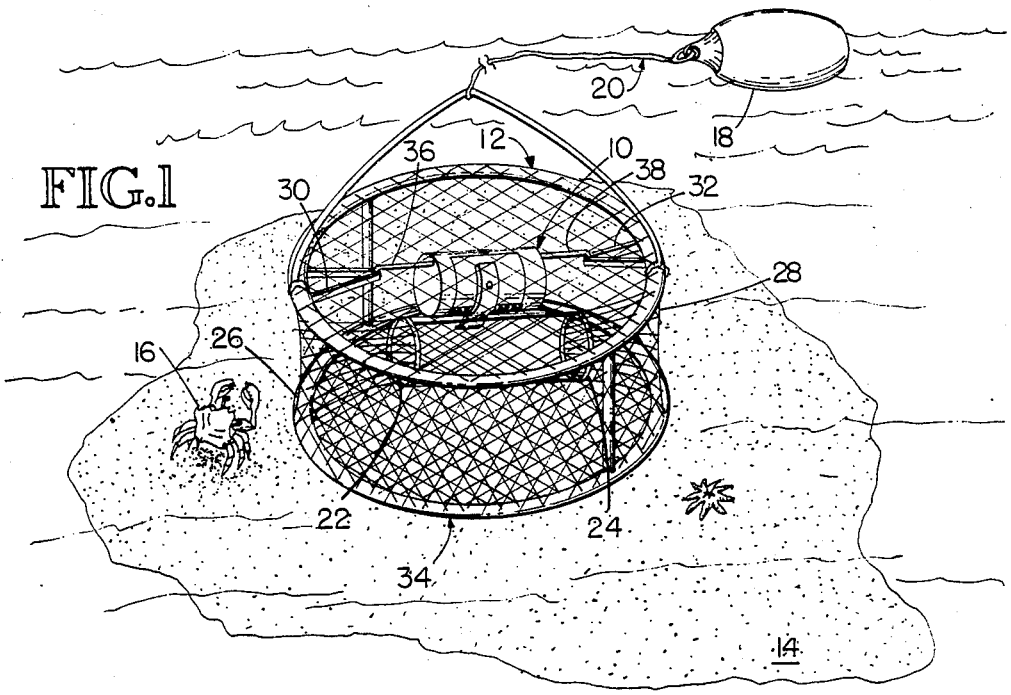
FIG. 1 is a perspective view of a crustacean trap located on the bottom of the sea with its position indicated by a float, having this bait container positioned above and offset of the aligned exits of the respective conical entry tunnels of the crustacean trap.

The bait container 10 is used in many types of crustacean traps used, for example, in trapping crab, shrimp, and lobster. A crustacean trap 12 for crab is illustrated in FIG. 1, resting on the sea bottom 14, where crab 16 live. This crustacean trap 12 is located by using a buoy 18 and a line 20 secured to the crustacean trap 12.

Preferably, the bait container 10 is positioned within this particular crab trap 12, offset to and above the aligned exits 22, 24 of the respective conical entry tunnels 26, 28 of this crustacean trap 12. Resilient holders 30, 32 are secured between the frame 34 of the crustacean trap 12 and the extending hooks 36, 38 of the bait container 10 to keep the bait container in position within the crustacean trap 12.

Figure 2:
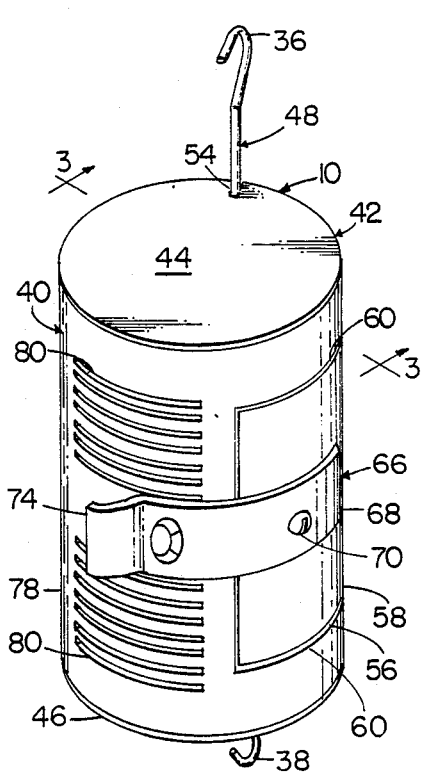
FIG. 2 is a perspective view of the closed bait container showing the extending rod portions terminating in hooks, the radial spaced cuts for the controlled dispensing of bait and controlled entry of sea life, the bait loading entry, the cover thereof, and the handle latch used to open and close the bait loading entry.

Preferably the bait container 10, illustrated in FIG. 2 when it is closed, is made of ABS plastic, which is a synthetic resin. Black ABS plastic tubing of 3½" or 4" diameter is cut in lengths preferably of at least 6" long to serve as the overall circumferential cylindrical portion 40, of a hollow cylindrical body 42 of this preferred embodiment of the bait container 10. A white ABS plastic sheet or white PVC plastic sheet, via punching operations, becomes, in part, the end caps 44, 46 which are glued to ends of the overall circumferential cylindrical portion 40. The white plastic is preferred for these end caps 44, 46 which tend to attract the crab 16 into the crustacean trap 12. PVC is the short term for the polyvinylchloride plastic material.

Figure 3:
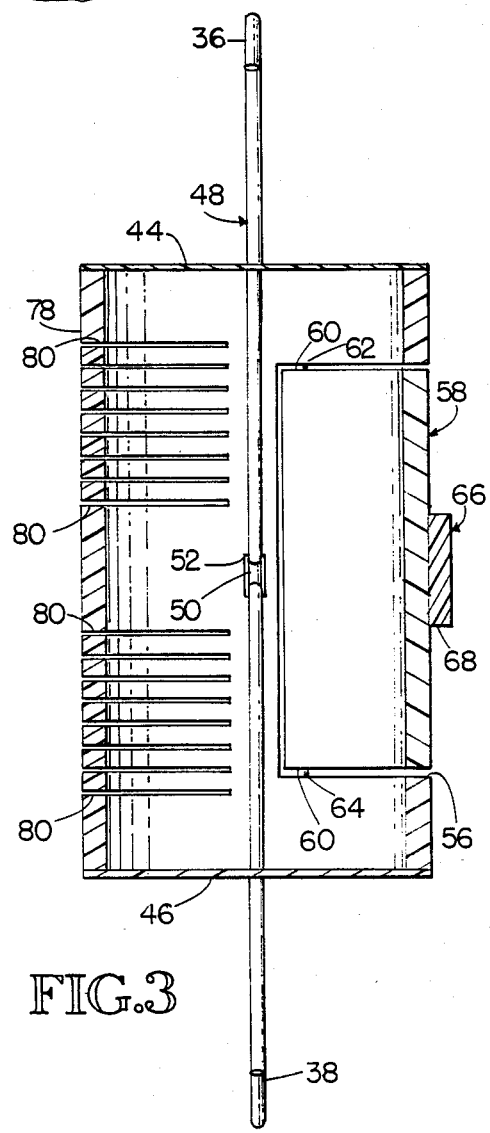
FIG. 3 is a sectional view of the bait container taken in the geometric longitudinal plane indicated by section line 3'3 in FIG. 2.

As shown in all the figures, but as particularly shown in FIGS. 2, 3, and 5, a positioner 48 is positioned and secured within the bait container 10 to extend therefrom and provide the extending hooks 36, 38 used in positioning and holding the bait container 10 within the crustacean trap 12, via the resilient holders 30, 32, shown in FIG. 1. Preferably, stainless steel rod or wire is used to form the positioner 48. At the central portion of the positioner 48, an offset radial portion 50 is formed to be interfitted with a recess 52 cut in hollow cylindrical body 42. The end caps 44, 46 each have a slot 54 to fit about the positioner 48.

A bait loading entry 56 is formed by cutting out a curved panel 58 of the ABS tube portion, which forms the hollow cylindrical body 42. This curved panel 58 is kept and reused as the cover 58 for closing the bait loading entry 56. Stainless steel pivot or hinge pins 60 are interfitted, via respective drilled holes 62, 64, between the hollow cylindrical body 42 and the curved panel, i.e. cover, 58, whereby the cover 58 is pivoted during opening and closing.

This cover 58 is manipulated and also secured in place by a handle-latch assembly 66. A strip 68 of ABS plastic is formed on a larger arc to fit the exterior of the cover 58 and be secured by using a stainless steel fastener 70. The strip 68 extends beyond the cover 58, where a depression is made, via heating, to form a latching projection 72. Just beyond this projection 72, an upturned portion forms a finger gripping tab 74. Another depression is made on the exterior of the hollow cylindrical body 42, via routing, to form a latching recess 76 to receive the the cover 58 and the use of the handle-latch assembly 66 is illustrated in FIG. 4, where the phantom lines indicate the opened cover 58, which is moved clear of the bait loading entry 56.

The cylindrical portion 78 of the hollow cylindrical body 42, which is not used in creating the bait loading entry 56 and the cover 58 with the handle-latch assembly 66, is used for creating the radial narrow slots 80, which are closely spaced longitudinally. Portions of the bait exit through these narrow slots 80. Some marine life will not enter the narrow slots 80, such as larger sand fleas. Preferably, these radial narrow slots 80 will be cut using a gang saw, during the manufacture of this bait container 10.

The initial materials are very available at relative low cost, the manufacturing equipment is of comparatively low cost, and the follow on manufacturing steps are conveniently and economically undertaken. The resulting bait containers 10 are offered at a comparative low cost and their service life is a very extended one. For barnacle removal, this bait container 10 is soaked in hydrochloric acid and thereafter rinsed in fresh water. The chlorophenol preservatives used during the manufacture of wood bait containers may not be permitted in the future, making the availability of this essentially all plastic bait container 10 very important.

I claim:

1. A bait container for crustacean traps, comprising:
   (a) a hollow cylindrical body having:
      (i) closed ends;
      (ii) some first cylindrical portions in turn having multiple narrow slots; and
      (iii) other second cylindrical portions in turn having a bait loading entry;
   (b) a cover for closing the bait loading entry, which is originally part of the other second cylindrical portions, which are removed to form the bait loading entry;
   (c) hinge pins are installed between the cover and the other cylindrical portions, whereby the cover is pivotally opened and then closed to continue the continuity of the hollow cylindrical body;
   (d) a securement means to keep the cover closed, comprising:
      (i) a partial cylindrical strip extending between the cover and some first cylindrical portions;
      (ii) a fastening means to secure the partial cylindrical strip to the cover;
      (iii) a receiving depression in some first cylindrical portions;
      (iv) a protruding portion in partial cylindrical strip adapted to fit into the receiving depression in some first cylindrical portions; and
   (e) positioning means adapted to receive holding means used for positioning the bait container within the crustacean trap.

2. A bait container, as claimed in claim 1, wherein the positioning means in turn comprises:
   (a) an elongated rod extending throughout the interior of the hollow cylindrical body and beyond terminating in respective hooks at each end, and having an offset radial portion for contacting the hollow cylindrical body; and
   (b) receiving portion in hollow cylindrical body to receive the offset radial of the elongated rod to keep this rod in position relative to the hollow cylindrical body.

3. A bait container, as claimed in claim 2, wherein the multiple narrows are radially directed and longitudinally spaced in the some first cylindrical portions of the hollow cylindrical body.

4. The bait container, as claimed in claim 3, wherein the hollow cylindrical body is made of plastic materials.

5. A bait container, as claimed in claim 4, wherein the first and second cylindrical portions are made from a cut length of ABS plastic tubing.

6. A bait container, as claimed in claim 5, wherein the closed ends are cut from ABS plastic sheet.

7. A bait container, as claimed in claim 6, wherein the ABS plastic sheet is white, serving to attract the crustaceans.

* * * * *